United States Patent [19]

Swidler et al.

[11] E Re. 30,860

[45] Reissued * Feb. 2, 1982

[54] PROCESS FOR TREATING CELLULOSIC MATERIAL WITH FORMALDEHYDE IN LIQUID PHASE AND SULFUR DIOXIDE

[75] Inventors: Ronald Swidler, Palo Alto; Katherine W. Wilson, San Diego, both of Calif.

[73] Assignee: Cotton, Incorporated, New York, N.Y.

[ * ] Notice: The portion of the term of this patent subsequent to Dec. 19, 1989, has been disclaimed.

[21] Appl. No.: 663,196

[22] Filed: Mar. 2, 1976

Related U.S. Patent Documents

Reissue of:

[64] Patent No.: 3,841,832
Issued: Oct. 15, 1974
Appl. No.: 332,332
Filed: Feb. 14, 1973

U.S. Applications:

[63] Continuation-in-part of Ser. No. 237,056, Mar. 22, 1972, abandoned, and Ser. No. 706,792, Feb. 20, 1968, abandoned, each is a continuation-in-part of Ser. No. 239,361, Mar. 29, 1972, abandoned.

[51] Int. Cl.[3] ..... D06M 13/12

[52] U.S. Cl. ..... 8/116.4; 8/125; 8/149.2

[58] Field of Search ..... 8/116.4, 125, 149.2

[56] References Cited

U.S. PATENT DOCUMENTS

| | | | |
|---|---|---|---|
| 3,642,428 | 2/1972 | Getchell et al. | 8/116.4 X |
| 3,653,805 | 4/1972 | Gamarra et al. | 8/116.4 |
| 3,660,013 | 5/1972 | Payet et al. | 8/116.4 |
| 3,663,974 | 5/1972 | Watanabe et al. | 8/116.4 |
| 3,884,632 | 5/1975 | Payet et al. | 8/116.4 |

*Primary Examiner*—Paul R. Michl
*Attorney, Agent, or Firm*—Burns, Doane, Swecker & Mathis

[57] ABSTRACT

The dimensional stability, crease retention, wrinkle resistance and smooth drying characteristics of a cellulose fiber-containing material such as a cotton fabric are improved by impregnating the material with an aqueous formaldehyde phase and curing the formaldehyde-containing material at high temperature in the presence of catalyst-forming sulfur dioxide while governing the amount of water in the system to provide a self-limiting reaction system, water being the limiting factor in the reaction by which an acid curing catalyst is formed from formaldehyde, sulfur dioxide and water. The aqueous formaldehyde phase may be applied to the material as such, or it may be formed in the material by exposing the latter in a humidified state to formaldehyde vapor. Sulfur dioxide may be introduced into the system either in the course of the aqueous impregnation step or in the curing step.

14 Claims, No Drawings

PROCESS FOR TREATING CELLULOSIC MATERIAL WITH FORMALDEHYDE IN LIQUID PHASE AND SULFUR DIOXIDE

Matter enclosed in heavy brackets [ ] appears in the original patent but forms no part of this reissue specification; matter printed in italics indicates the additions made by reissue.

CROSS REFERENCE

This application is a continuation-in-part of Ser. No. 237,056, filed Mar. 22, 1972 and now abandoned, which in turn is a continuation-in-part of Ser. No. 706,792, filed Feb. 20, 1968 and now abandoned; this application is also a continuation-in-part of application Ser. No. 239,361, filed Mar. 29, 1972 and now abandoned, which in turn is also a continuation of said Ser. No. 706,792.

BACKGROUND OF THE INVENTION

In recent years various methods have been devised for treating cellulosic fiber-containing products, such as cloth made of cotton or cotton blends, in order to impart durable crease retention, wrinkle resistance and smooth drying characteristics thereto. For example, cellulosic materials have been crosslinked with formaldehyde, giving durable crosslinks having good resistance to repeated laundering and also to various acids and alkalis, and chlorine bleaches. These formaldehyde treated cellulosic materials are resistant to discoloration and yellowing, and are less likely to produce a rash or other sensitization on the wearer than cellulosic materials treated with resins or precondensates of the urea-formaldehyde or substituted urea-formaldehyde types which may decompose and release formaldehyde while in use.

However, while formaldehyde has made a significant contribution to the cotton finishing art, the results have been far from perfect. For instance, in some cases the formaldehyde crosslinking treatment has tended to lack reproducibility, since control of the formaldehyde crosslinking reaction heretofore has been difficult. When high curing temperatures were used with an acid or potential acid catalyst, overreaction and degradation of the cotton often happened which considerably impaired its strength. On the other hand, when attempts were made to achieve reproducibility at temperatures of 50° C. or less, much longer reaction or finishing times were usually required, rendering the process economically relatively unattractive. This has been particularly true when sulfur dioxide was used as a catalyst in the previously known processes such as that disclosed in U.S. Pat. No. 3,663,974 or the corresponding British Pat. No. 980,980. In other cases, formaldehyde crosslinking has not been able to meet commercial standards with respect to dry wrinkle recovery. For these and similar reasons efforts have been continuing to develop new and better finishing processes for cotton and other cellulose fiber materials.

For the sake of completeness it may also be mentioned that it has been previously suggested in U.S. Pat. No. 2,870,041 that formaldehyde odors in fibrous material which has been treated with a urea-formaldehyde or melamine-formaldehyde type crosslinking resin can be prevented by treating such material with an aqueous solution of sodium meta bisulfite or of some sulfite or bisulfite salt which supplies $HSO_3^-$ ions to the system and forms a stable addition product with formaldehyde.

However, in such a system formaldehyde is not used as the creaseproofing agent and the "stabilization" of the formaldehyde in the system does not serve to creaseproof it. On the contrary, a customary dry high temperature cure of the material containing the melamine-formaldehyde or other crosslinking resin in the presence of a latent curing catalyst is required, which in turn requires removal of the salt catalyst from the cured fabric by washing. The possibility of using sulfur dioxide in aqueous solution as the formaldehyde-binding agent is also suggested in said U.S. Pat. No. 2,870,041. However, as only an unstable hydroxy methyl sulfonic acid is formed from formaldehyde and sulfur dioxide in the presence of water and this acid reverts to formaldehyde and sulfur dioxide on drying, it is evident that this previously suggested use of aqueous sulfur dioxide can not serve as an effective means either for the permanent removal of formaldehyde odors nor for any other significant improvement of the resin-treated material.

DESCRIPTION OF THE INVENTION

A primary object of the present invention is to provide a practical process for treating cellulose fiber-containing materials with formaldehyde to improve their shape holding properties while avoiding or alleviating the problems mentioned above.

A more specific object has been to develop a process for crosslinking cotton-containing fabrics with the aid of formaldehyde which is deposited in the fabric in aqueous phase, forming the required strong acid catalyst in the process substantially in the amount needed by reaction with sulfur dioxide under controlled and self-limiting conditions, thereby keeping acid injury to the fiber to a minimum while avoiding the need for after-washing.

These and other objects, as well as the scope, nature, and utilization of the invention will become more clearly apparent from the following more detailed description. Unless otherwise indicated, all proportions and percentages of materials or compounds are expressed on a weight basis throughout this specification and appended claims.

In accordance with the present invention, a process is provided for treating a cellulose fiber-containing material to improve its dimensional stability, crease retention, wrinkle resistance, and smooth drying characteristics by treating the material with formaldehyde in aqueous phase in the presence of sulfur dioxide under controlled moisture conditions at a temperature between about 65° and 150° C. or higher, e.g., in a chamber heated to between about 80° and 170° C.

The process, which is applicable to flat fabrics as well as completed garments, requires relatively short reaction times, gives high wrinkle recoveries and at the same time produces satisfactory tensile and tear strengths without requiring an after-wash of the treated fabric.

According to the invention claimed herein the cotton or other cellulose-containing fabric such as a cotton-polyester blend is impregnated with a liquid solution containing about 2 to 40 percent, preferably 10 to 30 percent, formaldehyde in water or similar liquid solvent to give a wet pick-up of between about 50 and 110 percent based on dry cotton weight. The fabric is then conditioned or dried to a moisture content of between about 4 and 20 percent, preferably between about 10 or 12 and 18 percent, passed into or placed in an atmosphere containing sulfur dioxide gas in a concentration which may range from as little as 0.1 volume percent on up, for instance, 5 to 30 volume percent sulfur dioxide, and maintained in the presence of sulfur dioxide under controlled moisture conditions at a temperature between about 80° and 150° C. or higher, for a time of between about 10 seconds and 2 hours, for instance, 30 seconds to 5 minutes, until the proper amount of formaldehyde is durably deposited or fixed in the fabric. Satisfactory durable wrinkle recovery and tear strength are obtained when formaldehyde is durably fixed in the fabric in an amount which may range from about 0.3 percent on upward, e.g., between 0.3 and 5 percent, based on the weight of the cellulose fibers in the fabric. When the vapor treatment is performed batchwise rather than by passing a stream of sulfur dioxide gas through the treating chamber, very small concentrations of $SO_2$ gas, e.g., as little as 0.1 volume percent, are sufficient to produce the required amount of catalyst because the reactive $SO_2$ gas tends to be absorbed in the moist fabric and thus builds up a suitable effective concentration therein.

The optimum reaction time under any given set of reaction conditions is one which is just long enough to effect the desired degree of crosslinking without unnecessarily overexposing the fabric to the acid catalyst. Increasing the reaction temperature or, surprisingly, increasing the moisture content of the reactive atmosphere or of the fabric permits reducing the reaction time under otherwise comparable conditions, and vice versa.

The moisture content of the fabric to be treated is important in this invention. Water is the limiting factor in the reaction of sulfur dioxide and formaldehyde which forms the required strong acid catalyst and which determines the extent of crosslinking of the cellulose by reaction with formaldehyde. Removal or displacement of water from the reaction system causes the system to be self-limiting and readily controllable. The strong but unstable catalyst makes the process fast as well as easy to control in a reproducible fashion. Initial moisture in the fabric serves to swell the cellulose fibers and to hold therein the formaldehyde, the sulfur dioxide and the resulting acid catalyst in an aqueous phase, but has only a relatively small effect on the total amount of formaldehyde which is incorporated into the fabric in both fixed and unfixed form. Nevertheless, because of its role in the formation of the acid curing catalyst and in swelling the cellulose fibers, such initial moisture and its subsequent evaporation have a significant effect on wrinkle recovery and flex abrasion characteristics of the cured fabric. Wet wrinkle recovery improvement is produced principally when the fibers are crosslinked while in a water swollen state whereas dry wrinkle recovery improvement is produced in the process principally after most of the initial moisture has evaporated from the fibers and they are crosslinked in a near-dry, collapsed state.

Generally speaking, too little initial moisture gives low wrinkle recovery values while too much moisture can cause excessive degradation of the fabric because of hydrolysis of the cellulose by the strong acid catalyst formed in the process. The amount of acid catalyst formed in the presence of water also affects the proportion of formaldehyde which actually forms durable crosslinks in the fabric as against that which is merely present as formaldehyde polymer.

For optimum control, the moisture content of the treating atmosphere is desirably maintained between about 10 and 70 volume percent, whereby evaporation of moisture from the fabric is retarded and the cellulose crosslinking reaction proceeds at a high rate while the cellulose fibers are in a water swollen condition. When the initial moisture content of the fabric introduced into the curing chamber is low such that the fabric dries rapidly on heating and the amount of acid catalyst formed is insufficient for assuring that the formaldehyde crosslinking reaction proceeds to the desired extent, one can make up for this by injecting steam into the reaction chamber and thereby increase the humidity of the system to the desired level as needed, as originally disclosed in our parent application Ser. No. 706,792, now abandoned, and our copending Ser. No. 239,361, now abandoned.

Because of its chemical function in this process, water plays an unusual role here in that the crosslinking reaction automatically tends to come to a stop when water evaporates from the fabric to a point where insufficient acid catalyst is formed or present to promote the crosslinking reaction. Whereas previous formaldehyde crosslinking processes were difficult to control, the decomposition of the catalyst upon drying makes the present process self-limiting in a desirable manner and makes it possible to produce a dry, crosslinked fabric which is essentially neutral upon removal from the high temperature treatment because dissipation of moisture from the hot fabric automatically results in the removal of any residual catalyst therefrom. Moreover, such formaldehyde polymer as is left on the treated fabric at the end of the curing or crosslinking step can be easily and permanently removed therefrom by simple heating, for instance, by heating the cured fabric in a stream of air or a mixture of air and high temperature steam or other nonreactive gas at a temperature above 100° C., preferably between 100° and 150° C. Such heating and stripping causes drying and decomposition of the acid catalyst as well as depolymerization and removal of unreacted formaldehyde from the cured fabric. This precludes liberation of irritating formaldehyde from the fabric during subsequent use and is in contrast to the behavior of urea-formaldehyde or melamine-formaldehyde crosslinking resins, which tend to decompose slowly and release formaldehyde odors gradually from treated fabrics during service.

The fabric can be conditioned to give the desired initial moisture content by any suitable method, such as by padding the fabric with aqueous formaldehyde and partially drying or by holding a dried fabric for a time at a suitable temperature and relative humidity until it reaches the desired moisture regain.

Instead of impregnating the fabric directly with an aqueous formaldehyde solution, it is possible to provide such a solution in the fabric by first steaming or otherwise humidifying it to give it an appropriate moisture content, e.g., 10 to 15 percent regain, and then releasing formaldehyde vapors in a chamber where the humidified fabric is held at or near ambient temperature, e.g., between 15° and 45° C., preliminary to the eventual heating and curing step. As a result, the formaldehyde vapors condense and dissolve in the moisture held in the fabric during such a preliminary impregnation step, prior to the curing step. The impregnation with aqueous formaldehyde solution and the subsequent curing in the controlled presence of moisture and added sulfur dioxide can be carried out consecutively in the same chamber, or separately in consecutive chambers.

Furthermore, it is possible to release not only formaldehyde vapor but also sulfur dioxide gas in such a preliminary impregnation step and thus dissolve both the required formaldehyde and the required sulfur dioxide in the conditioned or humidified fabric which is at ambient or relatively low temperature. In such a case no sulfur dioxide need to be added in the subsequent high temperature curing step.

Other, optional features of the invention include the addition of various monomeric or polymeric additives which serve to alter fabric properties. For instance, treatment of the cloth prior to the $SO_2$ treatment with a compound having an active hydrogen, and particularly with a hydroxyl compound such as ethylene glycol, triethylene or tetraethylene glycol dimethyl ether, glycerine, glycidol and the like, surprisingly results in a substantially greater increase in wet wrinkle recovery than dry wrinkle recovery, and can be used for this purpose when such an effect is desired. Other useful additives having an active hydrogen compound include amides such as urea proper or other ureas, e.g., cyclic ethyleneurea, allylurea and thiourea, acetamide, malonamide and acrylamide as well as sulfonamides such as methanesulfonamide; carbamates such as ethylcarbamate or hydroxyethylcarbamate; and so on. When such monomers which contain an active hydrogen are treated with formaldehyde in accordance with the present invention, they become fixed on the fabric so that they do not wash out. At dry add-ons of about 5 percent, e.g., between 5 percent and 20 percent pretreatment with the amides, and especially with urea, they tend to lead to unusually high tensile and tear strength retentions. They also add crispness to the fabric after being fixed thereon by the formaldehyde.

Moreover, pretreatment of the cloth, prior to the $SO_2$ treatment, with polymeric resinous additives that form soft films, such as conventional dispersions or latexes, can result in an unusually great incremental improvement in wrinkle recovery as compared with similar effects when such additives are used in conjunction with more conventional crosslinking treatments. Polymers can also improve the flex abrasion resistance and tear strength, or alter the ratio of dry wrinkle recovery to wet wrinkle recovery, or in some instances shorten the reaction time needed to produce an acceptable durable press fabric. Polymeric additives suitable for such purposes are, in most cases, available commercially in concentrated aqueous latex form, and it is desirable to dilute these to a concentration of 1 to 3 percent polymer before padding onto the fabric. Suitable polymeric additives include solid resinous or rubbery acrylonitrilebutadiene copolymers and mixtures containing the same with various vinyl resins; polyethylene; deacetylated copolymers of ethylene and vinyl acetate; polyurethanes; and various polymers of alkyl acrylates, other polyesters and polyamides. Coating of the fabrics with such polymers subsequent to the formaldehyde treatment may also be used to give similar results.

The present invention is useful for treating various natural or artificial cellulosic fibers alone or as mixtures with each other in various proportions or as mixtures with other fibers. Such natural cellulosic fibers include cotton, linen and hemp, and regenerated or artificial cellulosic fibers useful herein include, for example, viscose rayon and cuprammonium rayon. Other fibers which may be used in blends with one or more of the above mentioned cellulosic fibers are, for example, cellulose acetate, polyamides, polyesters, polyacrylonitrile, polyolefins, polyvinyl chloride, polyvinylidene chloride and polyvinyl alcohol fibers. Such blends preferably include at least 15 or 20 percent by weight and most preferably at least 35 or 40 percent by weight, of cotton or natural cellulose fibers. Blends containing 50 to 80 percent cotton and correspondingly 50 to 20 percent polyester fiber are eminently suited for treatment according to this invention.

The fabric may be knit, woven or non-woven, or be any otherwise constructed fabric. The fabric may be flat, creased, pleated, hemmed, or sewn or otherwise formed to produce an article such as a garment of any desired shape prior to curing. After processing, the formed crosslinked fabric will maintain substantially the original configuration for the life of the article, that is, a wash-wear or durable press fabric will be produced.

When treating with gaseous sulfur dioxide the conditioned fabric is passed into a treating atmosphere containing sulfur dioxide which may be obtained from any convenient source. In addition to the sulfur dioxide and water vapor, the treating atmosphere may contain inert gases such as air, nitrogen, carbon dioxide, helium, and the like. Since sulfur dioxide forms the required strong acid catalyst by reacting with formaldehyde and water in the fabric, sulfur dioxide as such need not be supplied to or present in the process over the entire duration of the crosslinking reaction, but its supply may be discontinued after the first minute or two or when an adequate supply of sulfur dioxide has been absorbed by the fabric. To take advantage of the self-limiting feature of this process, it can be advantageous to pass the fabric being treated through zones of progressively lower humidity. Obviously, a comparable self-limiting effect is not obtainable when the more common catalysts such as HCl, ammonium chloride or zinc nitrate are used.

To contact the fabric with the gaseous sulfur dioxide any suitable means may be employed. For example, a batch system utilizing a closed chamber or tube containing the gaseous sulfur dioxide may be used in which the conditioned, moisture-containing fabric may be placed and there exposed to the treating atmosphere for the appropriate time. As indicated earlier herein, the vapor treatment may be carried out either in the same chamber in which the impregnated fabric is actually cured or the vapor treatment and the hot curing step may be carried out consecutively in separate chambers. In the alternative, a dynamic or continuous system can be used containing a series of more or less distinct zones for conducting the desired combination of impregnation and conditioning, curing and purging steps through which the appropriate gases and the fabric or garments being treated are passed at appropriate rates relative to each other.

DESCRIPTION OF SPECIFIC EMBODIMENTS

The present invention is further illustrated by the following examples.

EXAMPLE 1

This is an illustrative example of sulfur dioxide catalyzed, formaldehyde solution treatment of cotton printcloth in accordance with the present invention.

A glass tubular reactor approximately 8 cm. in diameter and 40 cm. in length, wrapped with heating tape and mounted horizontally, was heated to the desired temperature. Sulfur dioxide was metered into the reactor from a storage tank to give a sulfur dioxide concentration in the reactor atmosphere of 10 volume percent, the remainder being ambient air.

A piece of conditioned cotton printcloth was then introduced into the reactor. The conditioned printcloth was mercerized cotton printcloth which had been padded with an aqueous solution of polyethylene, polyacrylate and formaldehyde, and then conditioned to give the fabric a moisture content of 10 percent. After treatment in the reactor the printcloth was taken out, rinsed with hot water, washed in a household washer to which 25 ml. of commercial alkylbenzene sulfonate household detergent powder (Vel) was added, and tumble dried in a household dryer. Table I gives data and results for three runs where temperature as well as duration of treatment were varied. As can be seen, operating at higher temperatures significantly improves the crease recoveries of the fabric while permitting shorter reaction times, which is commercially desirable.

TABLE I

| | Run 1 | Run 2 | Run 3 |
|---|---|---|---|
| Formaldehyde in pad bath | 13% | 13% | 13% |
| Polyethylene in pad bath | 2% emulsion | 2% emulsion | 2% emulsion |
| Polyacrylate in pad bath | 2% emulsion | 2% emulsion | 2% emulsion |
| Fabric moisture content | 10% | 10% | 10% |
| Sulfur dioxide concentration | 10% | 10% | 10% |
| Temperature | 48° C. | 80° C. | 80° C. |
| Duration of treatment | 20 min. | 20 min. | 10 min. |
| Wash-wear rating (AATCC 88A-1964T) | 3.5 | 4.0 | 3.5 |
| Wrinkle Recovery (AATCC 66-1959T) | | | |
| Dry (W + F) | 273 | 306 | 312 |
| Wet | 297 | 297 | 304 |
| Elmendorf Tearing Strength (ASTM D-1424-59) | 725 grams | 630 grams | 640 grams |
| Stoll Flex Abrasion Resistance (ASTM D-1175-61T) (using head and tension loads of ½ and 2 pounds respectively) | 490 | 280 | 430 |

EXAMPLE 2

Table II shows the data for a series of samples of print-cloth treated in accordance with this invention. First the samples were padded with various aqueous solutions containing from 5 to 20 percent formaldehyde, which in each case also included 3 percent softener in the form of finely dispersed acrylic polymer (Rhoplex K-87 Latex). In addition, in the case of Sample II-16 the pad bath included 66 percent aqueous isopropanol instead of water as the aqueous solvent; in the case of Sample II-17, the pad bath further included 5 percent tripropylene glycol monomethyl ether as a humectant; and in the case of Sample II-18, 5 percent "Span 20" sorbitan monolaurate. Excess solution was expressed from the samples on a pad roll to leave about 65 percent wet pick-up based on the weight of the fabric and the samples were then cured by being exposed for various times to a stream of hot vapors of $SO_2$ at widely different conditions in a 100 liter cylindrical aluminum reactor such as the one described in U.S. Pat. No. 3,706,526 at column 7, lines 30–38.

In the case of Samples II-5, II-6 and II-7, the padded fabrics were dried in an air oven at 75° C. for 3 minutes, 4 minutes and 3 minutes, respectively, before exposure to the hot $SO_2$ vapors in the reaction chambers; all the other samples were placed in the reaction chamber without pre-drying. Of course, the samples progressively dry out in the reaction chamber in any event as the hot treating gas is passed over them.

TABLE II

PRINTCLOTH FABRICS TREATED WITH AQUEOUS FORMALDEHYDE AND CROSSLINKS BY HEATING IN PRESENCE OF SULFUR DIOXIDE

| Sample No. | Pad Bath (% $CH_2O$) | $SO_2$ Flow Rate[a] (cc/min) | Air Flow Rate (cc/min) | Temp. (°C.) | Reaction Time (min) | Wrinkle Recovery Angle[b] (W + F) Dry (degrees) | Wrinkle Recovery Angle[b] (W + F) Wet (degrees) | Tearing[b] Strength (grams) |
|---|---|---|---|---|---|---|---|---|
| II-1 | 5 | 4 | 400 | 80 | 7 | 303 | 294 | 440 |
| II-2 | 5 | 4 | 400 | 80 | 5 | 248 | 257 | 660 |
| II-3 | 10 | 8 | 400 | 80 | 5 | 300 | 296 | 470 |
| II-4 | 10 | 8 | 400 | 80 | 10 | 295 | 292 | 400 |
| II-5 | 10 | 8 | 400 | 80 | 5 | 293 | 286 | 400 |
| II-6 | 10 | 8 | 400 | 80 | 5 | 266 | 269 | 540 |
| II-7 | 10 | 8 | 400 | 80 | 4 | 303 | 284 | 400 |
| II-8 | 10 | 24 | 200 | 100 | 5 | 323 | 289 | 350 |
| II-9 | 10 | 24 | 200 | 100 | 4 | 263 | 254 | 790 |
| II-10 | 10 | 200 | 0 | 105 | 5 | 332 | 320 | 220 |
| II-11 | 10 | 200 | 0 | 105 | 4 | 328 | 313 | 240 |
| II-12 | 20 | 200 | 0 | 120 | 3 | 346 | 338 | 280 |
| II-13 | 20 | 200 | 0 | 120 | 2 | 329 | 317 | 380 |
| II-14 | 5 | 4 | 200 | 120 | 2 | 314 | 297 | 410 |
| II-15 | 5 | 4 | 200 | 120 | 3 | 315 | 295 | 400 |
| II-16 | 10 | 4 | 400 | 120 | 5 | 302 | 309 | 420 |
| II-17 | 1 | 4 | 400 | 140 | 5 | 316 | 283 | 420 |
| II-18 | 1 | 4 | 400 | 140 | 5 | 304 | 286 | 300 |
| Untreated Control | n.a. | n.a. | n.a. | n.a. | n.a. | 166 | 129 | 750 |

Properties After 10 Laundering Cycles

| Sample No. | (W + F) Wrinkle Recovery Angle Dry (degrees) | (W + F) Wrinkle Recovery Angle Wet (degrees) | Tearing Strength (grams) |
|---|---|---|---|
| II-1 | 272 | 272 | 400 |

TABLE II-continued

PRINTCLOTH FABRICS TREATED WITH AQUEOUS FORMALDEHYDE AND CROSSLINKS BY HEATING IN PRESENCE OF SULFUR DIOXIDE

| | | | |
|---|---|---|---|
| II-2 | 225 | 260 | 600 |
| II-3 | 300 | 285 | 380 |
| II-4 | 284 | 287 | 390 |
| II-5 | 308 | 283 | 400 |
| II-6 | — | — | — |
| II-7 | 303 | 281 | 410 |
| II-8 | — | — | — |
| II-9 | — | — | — |
| II-10 | — | — | — |
| II-11 | — | — | — |
| II-12 | — | — | — |
| II-13 | 334 | 311 | 300 |
| II-14 | 320 | 284 | 450 |
| II-15 | 315 | 281 | 460 |
| II-16 | 306 | 280 | 400 |
| II-17 | 304 | 281 | 340 |

n.a. - not applicable
[a]The exact concentration of $SO_2$ in the reactor was not determined.
[b]After 1 laundering cycle Upon conclusion of the treatment the essentially dry and neutral samples were removed from the reactor and washed and tumble dried so that their durable press ratings could be determined. These ratings were determined after one such laundering-drying cycle and after 10 such cycles.

As can be seen from Table II, high degrees of dry and wet recovery could be obtained under a wide variety of treating conditions, with formaldehyde concentrations in the pad bath ranging from as little as 1 percent up to 20 percent.

At high $SO_2$ concentrations and at a temperature of 120° C. (Samples II-10, II-11, II-12 and II-13), the cross-linking reaction proceeds very rapidly such that very high degrees of wrinkle recovery are achieved in 2 minutes or less, whereas at longer reaction times the fabric becomes progressively weaker due to exposure to the large amount of strong acid formed in the process.

If the fabric is dried to a relatively low initial moisture content prior to heating in the presence of catalyst-forming $SO_2$, lower wrinkle recoveries are obtained in this system than when the reaction is initiated at a relatively higher moisture content under otherwise similar conditions. (Compare Samples II-6 with Samples II-5 and II-7.)

At relatively high initial moisture contents and relatively low reaction temperatures, higher wrinkle recoveries may be obtained by increasing the reaction time or the $SO_2$ concentration in the treating atmosphere. Compare Sample II-2 with Samples II-1 and II-3, and Sample II-9 with Samples II-8 and II-11.

EXAMPLE 3

In this series of tests, samples of twist twill cotton fabric of 7.8 oz./sq. yd. weight were padded with an aqueous solution containing 7.5 percent formaldehyde and 10 percent "Rhoplex K-87" finely dispersed acrylic polymer, excess solution was expressed from the samples on a pad roll to leave about 65 percent wet pickup based on the weight of the fabric, the samples were then exposed for 1 to 5 minutes (as shown in Table III) to a stream of $SO_2$ gas at a temperature of 20° C. in the reactor described in Example 2 and then (except in the case of Samples III-8 and III-9, which were not further treated) the fabrics containing formaldehyde and $SO_2$ absorbed therein were cured for 5 minutes in an oven which had been preheated to 150° C.

In the case of Samples III-1, III-2 and III-3, the padded fabrics were partially dried in air at room temperature to an estimated moisture content of about 10 percent on weight of fabric before being placed in the reactor and exposed to the $SO_2$ gas. Samples III-4, III-5, III-6, III-8 and III-9 were partially dried for 5 minutes in an air oven at 80° C. to reduce their moisture before exposure to the $SO_2$ gas; and Sample III-7 was exposed to the $SO_2$ wet, without any significant drying between padding and exposure to the $SO_2$ gas. Samples III-1 through III-7 were washed and tumble dried after their high temperature cure while Samples III-8 and III-9 were washed and tumble dried directly after the $SO_2$ treatment before the durable press properties of these samples were determined. The results are shown in Table III.

TABLE III

TWILL COTTEN FABRICS TREATED WITH AQUEOUS FORMALDEHYDE AND SULFUR DIOXIDE AND THEN HEATED

| (degrees) | | | Wrinkle Recovery Angle | | | | Stoll Flex Abrasion |
|---|---|---|---|---|---|---|---|
| Sample No. | $SO_2$ Exposure Time (min) | Postheating Time at 150° C. (min) | Dry Warp | Dry Fill | Wet Warp | Wet Fill | Warp (cycles) |
| III-1 | 1 | 5 | 156 | 144 | 151 | 136 | 248 |
| III-2 | 3 | 5 | 161 | 152 | 155 | 148 | 132 |
| III-3 | 5 | 5 | 167 | 148 | 164 | 151 | 90 |
| III-4 | 1 | 5 | 123 | 120 | 134 | 130 | 843 |
| III-5 | 3 | 5 | 154 | 132 | 149 | 132 | 704 |
| III-6 | 5 | 5 | 162 | 140 | 154 | 134 | 221 |
| III-7 | 1 | 5 | 167 | 150 | 170 | 162 | 48 |
| III-8 | 1 | 0 | 84 | 90 | 82 | 84 | 1202 |

TABLE III-continued

TWILL COTTEN
FABRICS TREATED WITH AQUEOUS FORMALDEHYDE AND SULFUR DIOXIDE AND THEN HEATED

| | | | | | | | |
|---|---|---|---|---|---|---|---|
| III-9 | 5 | 0 | 92 | 82 | 88 | 86 | 1748 |
| Untreated Control | — | — | 80 | 74 | 76 | 72 | 505 |

| | Tensile Properties | | | | | |
|---|---|---|---|---|---|---|
| | Warp | | | Fill | | |
| Sample No. | Work-to Rupture (in-lb) | Extension at Break (%) | Breaking Strength (lb) | Work-to Rupture (in-lb) | Extension at Break (%) | Breaking Strength (lb) |
| III-1 | 9.1 | 9.0 | 87.1 | 1.9 | 13.2 | 21.8 |
| III-2 | 6.1 | 8.0 | 70.7 | 1.6 | 9.9 | 16.0 |
| III-3 | 6.0 | 8.2 | 69.6 | 1.6 | 10.2 | 16.5 |
| III-4 | 18.4 | 13.6 | 120.0 | 2.5 | 12.0 | 24.6 |
| III-5 | 12.1 | 10.6 | 99.2 | 3.0 | 12.2 | 27.6 |
| III-6 | 7.9 | 8.9 | 79.5 | 2.6 | 12.3 | 24.6 |
| III-7 | 2.5 | 6.4 | 48.0 | 1.1 | 9.2 | 10.6 |
| III-8 | 36.6 | 22.1 | 163.1 | 12.1 | 19.1 | 66.1 |
| III-9 | 34.8 | 21.8 | 158.3 | 11.9 | 20.0 | 67.2 |
| Untreated Control | 30.5 | 13.4 | 171.0 | 11.2 | 17.2 | 66.7 |

Samples III-1 through III-7, which had the $SO_2$ gas applied thereto at room temperature and were then oven cured, all exhibited a high degree of wrinkle recovery. (In comparing Tables II and III, it should be noted that in Table II the reported wrinkle recovery angles are the sum of the values measured in the warp and in the fill directions, whereas in Table III each of these two values is reported separately.)

Sample III-7, which was not conditioned prior to exposure to the $SO_2$ gas, evidently underwent the highest degree of crosslinking, as indicated by the high wrinkle recovery angles. However, its tensile properties also were the lowest among those reported, because of fabric degradation due to the relatively large amount of strong acid present in the hot cure in this case.

At the other extreme, Samples III-8 and III-9 which were not heat cured after treatment with the $SO_2$ gas at room temperature showed only an insignificant improvement in durable press properties and only comparatively minor changes in tensile properties as compared with the untreated control, although the increase in tearing strength obtained as a result of the cool $SO_2$ treatment is worth noting.

In the absence of a final high temperature cure, little difference is observed between the oven dried Sample III-8 which was exposed to $SO_2$ gas for 1 minutes and the similarly dried Sample III-9 which was exposed to $SO_2$ gas for 5 minutes. On the other hand, a comparison between Samples III-4, III-5 and III-6 shows that the extent of formaldehyde crosslinking of the fibers increases with an increase in time of the $SO_2$ pretreatment. This is reflected both in the increasingly high recovery angles and in the decreasing tearing strengths. Evidently, more acid catalyst is present in the high temperature cure as the duration of the $SO_2$ pretreatment of the moist fabric is increased. A similar effect is observed when Samples III-1, III-2 and III-3 are compared with each other.

An increased intensity of treatment is also observed when one compares Sample III-1 against III-4, III-2 against III-5, and III-3 against III-6. Evidently, more moisture and therefore more acid catalyst is present in the samples which were conditioned in air at room temperature prior to the $SO_2$ treatment than in those which were conditioned by being partially dried at 80° C. for a short time.

No attempt was made in this series of tests to optimize either the initial moisture conditioning or the final curing conditions. However, the tests demonstrate that $SO_2$ can be absorbed in the formaldehyde-containing aqueous phase in the fabric at relatively low temperature prior to curing the fabric at an elevated temperature.

EXAMPLE 4

Still another procedure was used in this series of tests in depositing an aqueous phase containing formaldehyde and $SO_2$ in samples of the twist twill fabric described in Example 3 prior to a final curing step. In this series the fabrics were padded with a bath containing 3 percent acrylic polymer solids (Rhoplex K-87 Latex), partially dried in an air oven for 5 minutes at 80° C., exposed to formaldehyde-sulfur dioxide vapors at 120° C. for 1 minute in the reactor described in Example 2 above, removed from the reactor and then immediately post-cured by being placed for 5 minutes in an air oven which had been preheated to a specific temperature between 120° and 160° C., as indicated in Table IV. The cured samples were finally washed and tumble dried as usual before determining their durable press and tensile properties. For control purposes, in the case of Sample IV-11 the final post-curing step was omitted.

To test their durable press and tensile properties, the treated samples were washed in detergent and tumble dried and their wrinkle recovery angles, wash-wear ratings and tensile properties were measured in the conventional manner.

As can be seen from Table IV, very high crease recoveries were obtained in the case of all samples with the exception of Sample IV-11 which was not post-cured. In the latter case, the 1 minute treatment with formaldehyde and $SO_2$ vapors at 120° C. in the absence of any added steam was insufficient to permit crosslinking of the cellulose with formaldehyde to proceed to the desired extent. On the other hand, in all the other cases the heat soaking step immediately following the formaldehyde-$SO_2$ vapor treatment of the moist fabric produced a good balance of durable press and tensile properties. This shows that exposure of a moist fabric to

TABLE IV

CONDITIONED TWIST TWILL FABRICS EXPOSED TO FORMALDEHYDE - SULFUR DIOXIDE FOR ONE MINUTE AND THEN HEAT SOAKED AT 120°-160° C.

| Sample No. | Heat-Soaking Temp (°C.) | Wrinkle Recovery Angle (degrees) Warp Dry | Warp Wet | Fill Dry | Fill Wet | Wash-Wear Rating | Stoll Flex Abrasion Warp (cycles) |
|---|---|---|---|---|---|---|---|
| | | Properties After 1 Washing | | | | | |
| IV-1 | 160 | 143 | 145 | 122 | 126 | 3.6 | 270 |
| IV-2 | 160 | 144 | 149 | 130 | 136 | 4.3 | 460 |
| IV-3 | 150 | 150 | 148 | 128 | 122 | 4.2 | 440 |
| IV-4 | 150 | 150 | 145 | 138 | 130 | 4.0 | 430 |
| IV-5 | 140 | 150 | 146 | 130 | 125 | 4.0 | 300 |
| IV-6 | 140 | 156 | 147 | 132 | 133 | 4.2 | 380 |
| IV-7 | 130 | 162 | 166 | 138 | 144 | 4.1 | 380 |
| IV-8 | 130 | 155 | 154 | 141 | 126 | 4.3 | 220 |
| IV-9 | 120 | 150 | 144 | 122 | 128 | 4.2 | 510 |
| IV-10 | 120 | 141 | 140 | 133 | 130 | 4.0 | 670 |
| IV-11 | (Not Cured) | 97 | 104 | 104 | 107 | 2.5 | 1190 |
| | | Properties After 25 Washings | | | | | |
| IV-1 | 160 | 120 | 130 | 111 | 114 | 3.2 | 370 |
| IV-2 | 160 | 131 | 140 | 120 | 122 | 3.8 | 350 |
| IV-3 | 150 | 136 | 135 | 117 | 110 | 3.8 | 270 |
| IV-4 | 150 | 146 | 143 | 131 | 123 | 4.0 | 330 |
| IV-5 | 140 | 140 | 140 | 120 | 116 | 3.9 | 340 |
| IV-6 | 140 | 140 | 140 | 124 | 122 | 4.0 | 340 |
| IV-7 | 130 | 144 | 150 | 130 | 130 | 3.7 | 250 |
| IV-8 | 130 | 140 | 138 | 128 | 126 | 4.0 | 260 |
| IV-9 | 120 | 108 | 131 | 106 | 108 | 4.0 | 460 |
| IV-10 | 120 | 126 | 138 | 118 | 118 | 3.9 | 610 |
| IV-11 | (Not Cured) | 96 | 97 | 86 | 95 | 2.0 | 1240 |
| Untreated Control | n.a. | 96 | 74 | 86 | 75 | n.a. | 870 |

| Sample No. | Warp Work-to-Rupture (in.-lb) | Warp Extension at Break (%) | Warp Tensile Strength (lb) | Fill Work-to-Rupture (in.-lb) | Fill Extension at Break (%) | Fill Tensile Strength (lb) |
|---|---|---|---|---|---|---|
| | Properties After 1 Washing Tensile Properties | | | | | |
| IV-1 | 11.7 | 14.4 | 91 | 3.7 | 12.8 | 33 |
| IV-2 | 10.8 | 14.0 | 83 | 3.3 | 13.4 | 32 |
| IV-3 | 10.5 | 13.6 | 87 | 4.1 | 14.6 | 38 |
| IV-4 | 12.2 | 15.6 | 92 | 3.1 | 14.4 | 30 |
| IV-5 | 10.0 | 13.6 | 84 | 3.7 | 14.4 | 34 |
| IV-6 | 10.5 | 14.2 | 84 | 2.9 | 12.7 | 30 |
| IV-7 | 11.8 | 14.3 | 92 | 2.6 | 20.0 | 28 |
| IV-8 | 10.2 | 14.0 | 84 | 3.1 | 12.6 | 32 |
| IV-9 | 12.5 | 14.8 | 94 | 4.1 | 13.1 | 38 |
| IV-10 | 17.1 | 16.8 | 106 | 3.2 | 12.4 | 31 |
| IV-11 | 34.7 | 21.2 | 152 | 9.5 | 16.8 | 61 |
| | Properties After 25 Washings | | | | | |
| IV-1 | 10.0 | 14.1 | 82 | 4.6 | 13.4 | 43 |
| IV-2 | 11.3 | 15.8 | 86 | 2.5 | 11.4 | 30 |
| IV-3 | 10.7 | 15.6 | 86 | 3.1 | 12.5 | 32 |
| IV-4 | 10.5 | 15.3 | 82 | 2.6 | 12.6 | 30 |
| IV-5 | 11.8 | 15.2 | 92 | 3.1 | 12.8 | 32 |
| IV-6 | 14.2 | 17.2 | 98 | 2.6 | 12.4 | 30 |
| IV-7 | 11.9 | 16.0 | 92 | 2.8 | 13.2 | 31 |
| IV-8 | 8.7 | 14.1 | 78 | 3.2 | 12.9 | 34 |
| IV-9 | 14.4 | 16.3 | 99 | 3.9 | 12.2 | 39 |
| IV-10 | 13.5 | 15.9 | 99 | 3.4 | 13.2 | 34 |
| IV-11 | 40.8 | 26.6 | 147 | 8.7 | 16.0 | 60 |
| Untreated Control | 14.0 | 21.1 | 162 | 10.6 | 19.1 | 64 |

formaldehyde and $SO_2$ vapors under mild conditions which are insufficient to impart the desired durable press properties to the fabric can in fact form a catalyzed reactive aqueous formaldehyde phase in the fabric such that the latter, having a proper initial moisture content, can be subsequently crosslinked to the desired extent by further heat treatment without adding any more $SO_2$ or formaldehyde to the system.

It should be understood, of course, that even in the case of a vapor treatment such as that used in preparing Sample IV-11 satisfactory durable press properties can be obtained directly by a proper control of treating conditions as disclosed in our U.S. Pat. No. 3,706,526, without any separate post-cure, e.g., by applying the vapor treatment to the initially moist fabric at a higher temperature or for a longer time or under more moist conditions, as by reducing the rate of vapor flow through the reactor or by adding stream to such vapors, or by a combination of these factors.

A procedure of this type, involving chemical pretreatment under relatively mild conditions followed by a separate heat soaking step of the pretreated, preconditioned fabric in hot air or a hot air-steam mixture under controlled moisture conditions may be particularly advantageous in the continuous processing of flat fabrics.

The effects of moisture content, of amount of formaldehyde durably fixed in the fabric and of additive pretreatments are similar in this system wherein formaldehyde is applied in liquid phase, as in the vapor phase system described in parent application Ser. No. 706,792 filed Feb. 20, 1968 and now abandoned, and in U.S. Pat. No. 3,706,526 which was filed as a continuation-in-part of the former.

While all of the above runs were conducted at atmospheric pressure, sub- or superatmospheric pressures may be used but are not necessary.

The essential principles, as well as the preferred embodiments and modes of operating of the present invention have been described in the foregoing specification. However, the invention which is intended to be protected herein may be practiced otherwise than as described without departing from the scope of the appended claims.

What is claimed is:

1. A process for improving the dimensional stability, wrinkle resistance and smooth drying characteristics of a cellulose fiber-containing fabric which comprises:

a. depositing water and formaldehyde in the fabric to provide therein an aqueous phase comprising formaldehyde and conditioning the fabric to give the cellulose fibers a moisture content of between about 4 and 20 percent based on dry weight of cellulose;

b. heating the conditioned moisture-containing and formaldehyde-containing fabric in the presence of catalyst-forming sulfur dioxide and water vapor in a reaction zone at a temperature above about 65° C. for a time of between about 10 seconds and 2 hours until formaldehyde in an amount equal to at least 0.3 percent by weight of said cellulose fibers is durably deposited in the fabric and the cellulose fibers become effectively crosslinked, said heating being conducted while governing the amount of water in the system to control the amount of moisture in said fabric and thereby regulate the amount of strong acid catalyst formed therein by the reaction of formaldehyde and sulfur dioxide, a reaction in which water is the limiting factor, to provide a self-limiting reaction system; and c. heating the thus crosslinked fabric to dissipate water vapor, residual catalyst and unbound formaldehyde therefrom.

2. A process according to claim 1 wherein the fabric is heated in step (b) to a temperature between about 80° and about 150° C. and is dried and unbound formaldehyde is vaporized therefrom by heating it in step (c), thereby directly producing a dry, crosslinked, essentially neutral fabric.

3. A process according to claim 1 wherein the fabric is treated prior to the formaldehyde crosslinking step with a compound containing an active hydrogen and selected from the group consistng of polyhydric alcohols, ureas, amides and carbamates.

4. A process according to claim 1 wherein the conditioned moisture-containing fabric is treated with sulfur dioxide gas before being heated in said reaction zone in step (b).

5. A process according to claim 1 wherein the fabric is one containing at least 35 percent by weight of cotton and wherein the aqueous formaldehyde solution contains between about 1 and 40 percent by weight of formaldehyde.

6. A process for improving the dimensional stability, wrinkle resistance and smooth drying characteristics of cotton containing fabrics which comprises:

a. applying to the fabric an aqueous solution containing about 2 to 40 percent by weight of formaldehyde and conditioning the fabric to give the cotton a moisture content of between about 4 to 20 percent based on dry weight of cotton;

b. heating the conditioned moisture-containing and formaldehyde-containing fabric to a temperature of between about 80° and about 150° C. in the presence of sulfur dioxide in an atmosphere containing water vapor in a reaction zone for a time of between about 10 seconds and 2 hours until formaldehyde in an amount equal to at least 0.3 percent by weight of said cotton is durably fixed in the fabric and the cotton fibers are effectively crosslinked, said heating being conducted while governing the amount of water in the reaction zone to control the amount of moisture in said fabric and thereby regulate the amount of strong acid catalyst formed therein by the reaction of formaldehyde and sulfur dioxide, a reaction in which water is the limiting factor, to provide a self-limiting reaction system; and c. at the end of said crosslinking step (b) removing residual catalyst and unbound formaldehyde from the fabric by heating it in an inert gaseous atmosphere, thereby directly producing a dry, crosslinked, essential neutral fabric.

7. A process according to claim 6 wherein steam is injected into the reaction zone in step (b) to adjust the water vapor concentration therein at between about 10 and 70 percent by volume and thereby to retard evaporation of moisture from the conditioned fabric and control the crosslinking reaction.

8. A process for improving the dimensional stability, wrinkle resistance and smooth drying characteristics of cotton-containing fabrics which comprises:

impregnating in the fabric an aqueous solution containing about 10 to 30 percent formaldehyde;

drying and conditioning the impregnated fabric to a moisture content of between about 4 to 20 percent;

heating the moisture-containing and formaldehyde-containing fabric in a reactive gaseous atmosphere comprising water vapor and about 0.1 to 30 volume percent sulfur dioxide at a temperature between about 90° and about 150° C. for a time of from about 10 seconds to about 2 hours until formaldehyde in an amount equal to at least 0.3 percent by weight of said cotton fibers is durably fixed in the fabric and the cotton fibers are effectively crosslinked, said heating being conducted while governing the amount of water vapor in said atmosphere to control the amount of moisture in said fabric and thereby regulate the amount of strong acid catalyst formed by the reaction of formaldehyde and sulfur dioxide, a reaction in which water is the limiting factor, to provide a self-limiting reaction system; and drying the thus crosslinked fabric.

9. A process according to claim 8 wherein the fabric is treated in a pad bath containing an amide prior to moisture conditioning.

10. A process according to claim 8 wherein urea or thiourea is applied to the fabric together with the formaldehyde solution.

11. A process according to claim 10 in which the fabric being treated is a flat fabric and the crosslinked fabric is washed to remove residual reactants therefrom, and the washed, crosslinked fabric is dried.

*12. A process using formaldehyde and sulfur dioxide vapors for treating cellulosic fabric-containing material to impart a durable press thereto comprising conveying said material through a first zone to introduce moisture thereinto, conveying the material then through a second zone to subject it to formaldehyde and sulfur dioxide vapors, and conveying said material next through a third zone to effect a drying thereof and to subject the material to a curing temperature of between* 120° C. and 160° C.

*13. A process for treating cellulosic fabric-containing material to impart a durable press thereto comprising conveying said material through a first zone to introduce moisture thereinto, conveying the material then through a subsequent treatment zone to subject it to sulfur dioxide vapors, thereafter conveying said material through a subsequent curing zone to subject the material to a curing temperature of above about 65° C., and wherein prior to conveying said material through said curing zone, and prior to or during said treatment with sulfur dioxide vapors, conveying said material through a zone to impregnate it with formaldehyde.*

*14. A process according to claim 13 wherein said material is impregnated with formaldehyde in said first zone.*

* * * * *